United States Patent [19]

Bachmann et al.

[11] Patent Number: 5,167,815
[45] Date of Patent: Dec. 1, 1992

[54] APPARATUS FOR REMOVING SUBSTANCES FROM THE SURFACE OF A LIQUID

[75] Inventors: Rolf Bachmann, Koppigen; Kurt Kummer, Leutzelflueh; Werner Iseli, Cham, all of Switzerland

[73] Assignee: Blaser & Co. AG, Hasle-Ruegsau, Switzerland

[21] Appl. No.: 525,923

[22] Filed: May 18, 1990

[30] Foreign Application Priority Data

May 30, 1989 [EP] European Pat. Off. ........ 89810401.3

[51] Int. Cl.⁵ .............................................. C02F 1/40
[52] U.S. Cl. .................... 210/242.3; 210/524; 210/540; 210/923
[58] Field of Search ............... 210/242.3, 242.4, 523, 210/524, 525, 923, 538, 540

[56] References Cited

U.S. PATENT DOCUMENTS

| | | | |
|---|---|---|---|
| 3,358,838 | 12/1967 | Kosar et al. | 210/242.3 |
| 4,172,036 | 10/1979 | Movis | 210/242.3 |
| 4,196,087 | 4/1980 | Gordon | 210/242.3 |
| 4,220,533 | 9/1980 | Baer et al. | 210/242.3 |
| 4,368,122 | 1/1983 | Ravagnan | 210/242.3 |
| 4,651,762 | 3/1987 | Bowden | 210/523 |
| 4,976,855 | 12/1990 | Virtanen | 210/923 |

FOREIGN PATENT DOCUMENTS 2050856 1/1981 United Kingdom .

Primary Examiner—Stanley S. Silverman
Assistant Examiner—Christopher Upton
Attorney, Agent, or Firm—Ladas & Parry

[57] ABSTRACT

For removing oil from a liquid surface (2), an outer circumferential area (14) of a receiving disk (1) rotated by a drive (3) is immersed in the liquid and the adhering oil is removed therefrom by strippers (42,43). The afterflow of oil to the receiving disk (1) is improved by a surface flow produced by a feed screw (11). The immersion depth of the receiving disk (1) is kept constant by a float (13). The horizontal orientation of the rotation axis (36) of the apparatus is ensured by the parallelogram-like arrangement of pivotable supporting arms.

9 Claims, 3 Drawing Sheets

APPARATUS FOR REMOVING SUBSTANCES FROM THE SURFACE OF A LIQUID

BACKGROUND OF THE INVENTION.

The invention relates to an apparatus for removing substances from the surface of a liquid, particularly the oil floating on the cooling lubricant of a machine tool, with a receiving disk connected to a rotary drive and intended for partial immersion in the liquid, a device for removing the substance received from the receiving disk and with transfer means for draining off to the outside the removed substance over the wall of the liquid-enclosing container.

For removing the oil from the surface of a liquid, a known apparatus of this type has a plastic disk driven by an electric motor and provided with a smooth surface to which the oil is attached by adhesion, so as to be subsequently removable by a stripper fixed to the apparatus and then flows away via a channel extending over the container edge. The actual apparatus is screwed firmly to the liquid container. As the oil must flow of its own accord over the surface of the liquid to said apparatus, it functions relatively slowly and only makes it possible to reduce the thickness of the oil layer on the liquid without completely removing it, because as from a certain minimum thickness the oil layer breaks and consequently no longer flows towards the apparatus. The remaining oil layer prevents the air supply to the liquid, as is e.g. particularly advantageous for the cooling lubricants of machine tools due to the premature aging which then occurs.

SUMMARY OF THE INVENTION

The problem of the present invention is to obviate the aforementioned disadvantages of known apparatuses and thereby improve an apparatus of the aforementioned type in such a way that it has increased efficiency and consequently within a much shorter time can substantially completely remove substances from the surface of liquids. According to the invention this problem is solved by a feed mechanism for positioning in the vicinity of the liquid surface for producing a surface flow directed towards the receiving disk.

As a result of the surface flow produced by the feed mechanism constantly new substance, e.g. oil floating on the liquid surface flows in accelerated form to the receiving disk, so as to be received by the latter and removed.

The aforementioned known apparatus has the further disadvantage that it can only function at a specific liquid level and is consequently not suitable for regularly cleaning a liquid surface, e.g. on the basis of a time program. Thus, according to a preferred embodiment of the invention, the apparatus is given a floatable construction, so that the liquid level has an optimum, constant height relative thereto.

BRIEF DESCRIPTION OF THE DRAWINGS

Further advantageous embodiments of the inventive apparatus form the subject matter of dependent claims and the following description of an embodiment relative to the drawings, wherein show:

Figure 1:
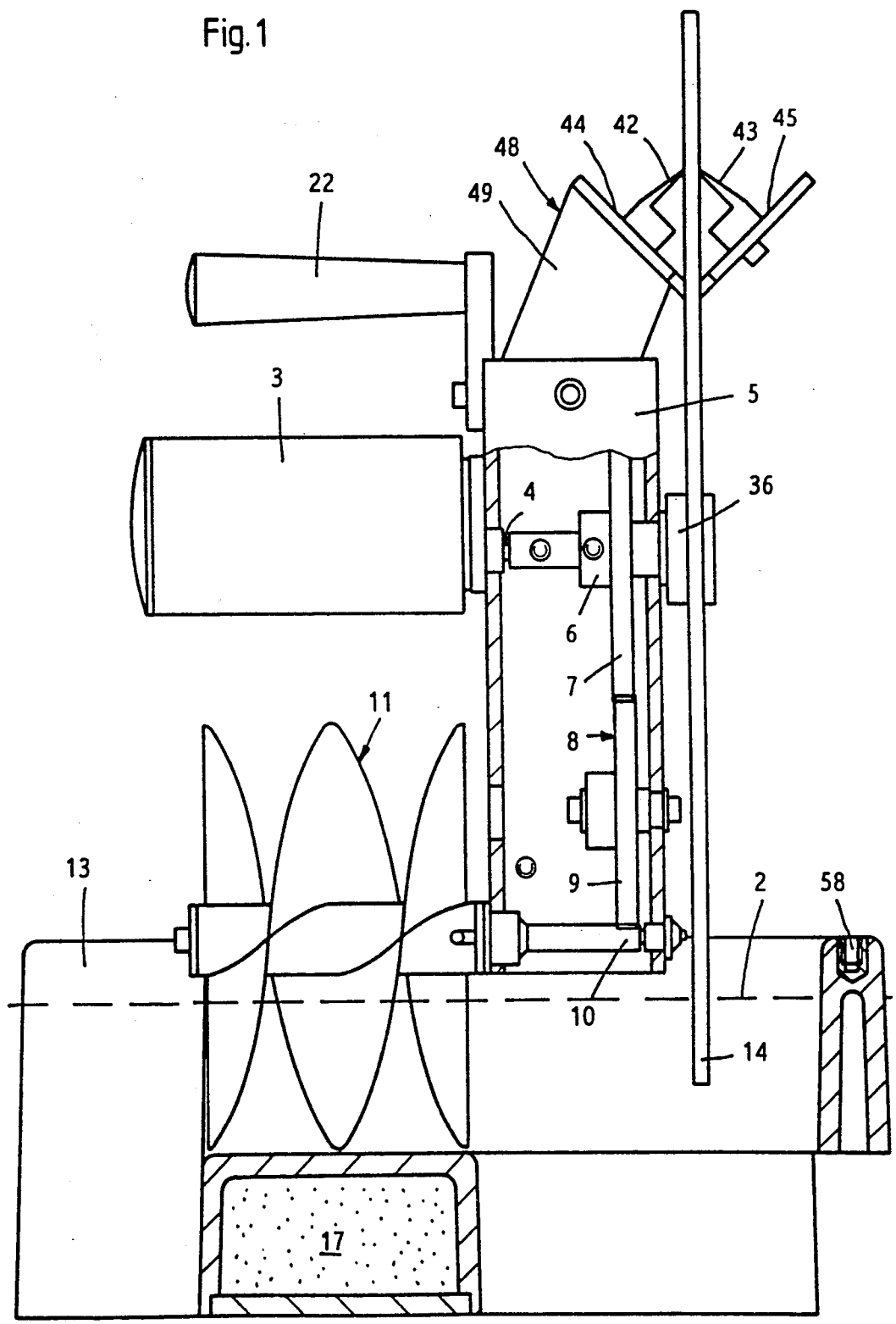
FIG. 1 a part vertically sectioned side view of the apparatus.
Figure 2:
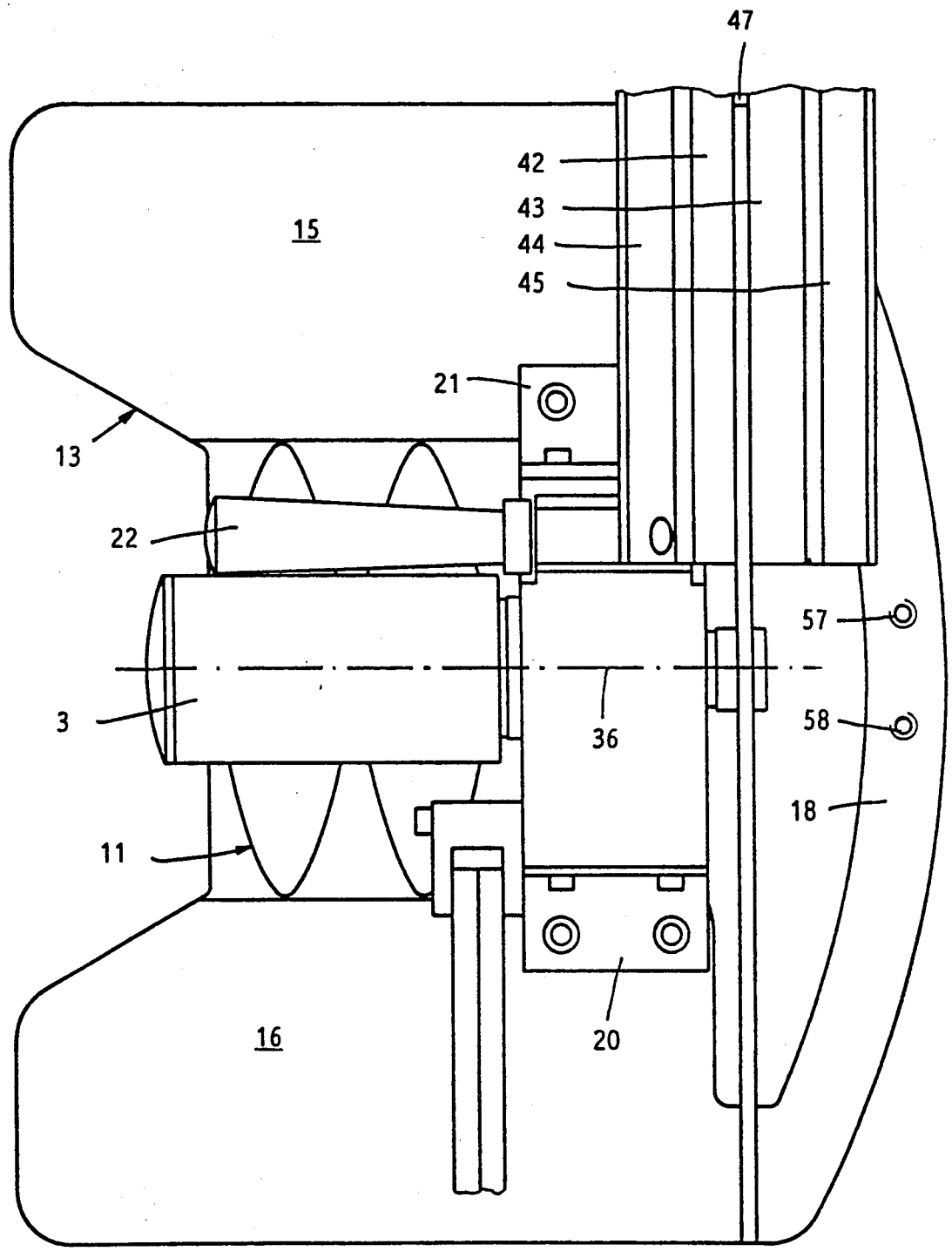
FIG. 2 a plan view of the apparatus with an only partial representation of the channel and the supporting arms.

DETAILED DESCRIPTION OF THE PREFERRED EMBODIMENT.

The apparatus has a circular, planar receiving disk 1, e.g. made from plastic, acrylic glass (plexiglass), etc., with respect to which engine oil has a high adhesiveness. Its diameter is made as large as possible, in order to achieve high efficiency and so as to be able to still drain off the oil received in the case of large variations in the height of the liquid level 2, as will be explained in greater detail hereinafter. In view of its vertical arrangement in the container for the cooling lubricant of a machine tool, the diameter of the receiving disk 1 is e.g. 300 mm. The receiving disk 1 is directly driven by a geared motor 3 with a low rotational speed of e.g. 5 r.p.m. and with whose output shaft 4 it is equiaxially mounted in the housing support 5.

The connecting shaft 6 between the motor 3 and the receiving disk 1 carries a gear wheel 7 of a transmission gear 8, which via a further gear wheel 9 mounted through the housing support 5 drives the toothed shaft 10 of a horizontally positioned feed screw 11. This leads to a rotational speed of 60 r.p.m. for the feed screw 11. Its diameter is 120 mm. The use of the feed screw 11 and its relatively low rotational speed lead to a relatively calm surface flow in the liquid as a result of which the oil layer floating thereon is fed in uniform manner and without emulsifying with the liquid to the receiving disk 1. This feed action leads to a damming back of the oil layer in front of the receiving disk 1 or to a thicker oil layer in the vicinity thereof, so that the effectiveness of the oil reception by the receiving disk 1 and therefore the efficiency of the apparatus is greatly increased. Moreover, as a result of the feed screw 11, a suction action is exerted on the surface oil which is fed to the receiving disk 1 and which without said forced feed effect would not flow thereto, so that the liquid surface can be completely freed from oil or the like.

Another measure for improving the effectiveness of the receiving disk 1 and therefore the efficiency of the apparatus consists of maintaining an optimum liquid level relative to the feed screw 11 and relative to the receiving disk 1 as a result of the floating construction of the apparatus. For this purpose it has a float 13, which surrounds in U-shaped manner the feed screw 11 and the area 14 of receiving disk 1 immersed in the liquid. The float 13 has two lateral parts 15,16, which are interconnected below the feed screw 11 by a cross member 17 and in the flow direction behind the receiving disk 1 by a curved web part 18. These parts of the float 13 are either hollow bodies or they comprise e.g. foam plastic-filled shell bodies. The housing support 5 is fixed to the float 13 by means of lateral flanges 20,21.

A handle 22 fixed in the upper area of the housing support 5 makes it possible to raise the apparatus in simple manner from the liquid, after previously releasing a fastening 24 from the liquid container wall 25 or in order to correspondingly insert the same in the reverse manner in the liquid.

The fastening 24 is appropriately constructed in such a way that it keeps the apparatus oriented in a stable horizontal manner against tipping forces, so that the float 13 is only provided for an adequate buoyancy.

Such a fastening 24 is necessary in the represented embodiment of the apparatus, because its centre of gravity is unstable due to the arrangement of the geared motor 3 above the liquid level. However, with a correspondingly increased constructional expenditure, it would also be possible to place the centre of gravity in stable manner below the liquid level. The fastening 24 is constructed in the manner of a kinematic parallelogram, in that two supporting arms 26,27 are mounted parallel to one another on the one hand on a support 29 associated with a fastening device 28 and on the other hand on a bracket 30 fixed to the housing support 5 of the floating part of the apparatus, in each case about a spindle 31 to 34. The parallel movement of the supporting arms 26,27 in order to adapt to a height change of the liquid level 2 in the liquid container prevents a tilting of the apparatus about a horizontal axis parallel to the rotation axis 36 of the receiving disk 1 and its mounting about spindles 31 to 34 prevents a tilting movement about a horizontal axis at right angles to said rotation axis 36.

The fastening device 28 makes it possible to maintain the apparatus at an appropriate point within the liquid container intimated by the wall 25. It can be constructed in numerous different ways, e.g. as a clamping device or, in the represented manner, as a holding magnet 38. The said holding magnet 38 is pivotable by means of a spindle 39 adapting to the slope of a suitable fastening surface, e.g. of the horizontal edge 40 of the liquid container and can subsequently be locked in said pivot position by not shown means, e.g. a clamping screw, in order to rigidly fix the support 29 of fastening 24 constantly in the represented vertical position.

In order to remove the oil taken up by adhesion by the receiving disk 1, preferably on either side thereof are provided hard rubber or similar strippers 42,43, which are in each case fixed parallel thereto on a draining channel 44,45. Both draining channels 44,45 are firmly connected parallel to one another and in the vicinity of the receiving disk 1 form a slot 47 between them. The draining unit 48 formed in this way from pairs of draining channels and strippers is fixed by means of a short retaining leg 49 fitted to one of the draining channels 44 to the housing support 5 of the apparatus. This fastening is either in rigid form with the minimum slope of the draining channels 44,45 necessary for the outflow of the stripped oil or, preferably, is pivotable about a spindle 50, so that the draining channels 44,45 always have the maximum slope by engaging on the edge 51 of the liquid container wall 25. In order to make the apparatus operable for a maximum range of height changes of the liquid level 2 relative to the liquid container edge 51, the receiving disk 1 has a maximum diameter, so that the top end 53 is as high as possible over the liquid level 2. However, the distance from this top end from the circumference of the receiving disk 1 should be larger than the immersion depth of disk 1 in the liquid or greater than the radial width of the outer marginal zone of the receiving disk 1 wetted by the oil, so that the oil can be completely stripped.

A complete independence of the oil draining from the height of the liquid level 2 in the liquid container would only be possible with much greater technical expenditure, in that e.g. a pump was provided on the apparatus which pumped out the stripped oil from the liquid container by means of a hoseline.

Figure 3:
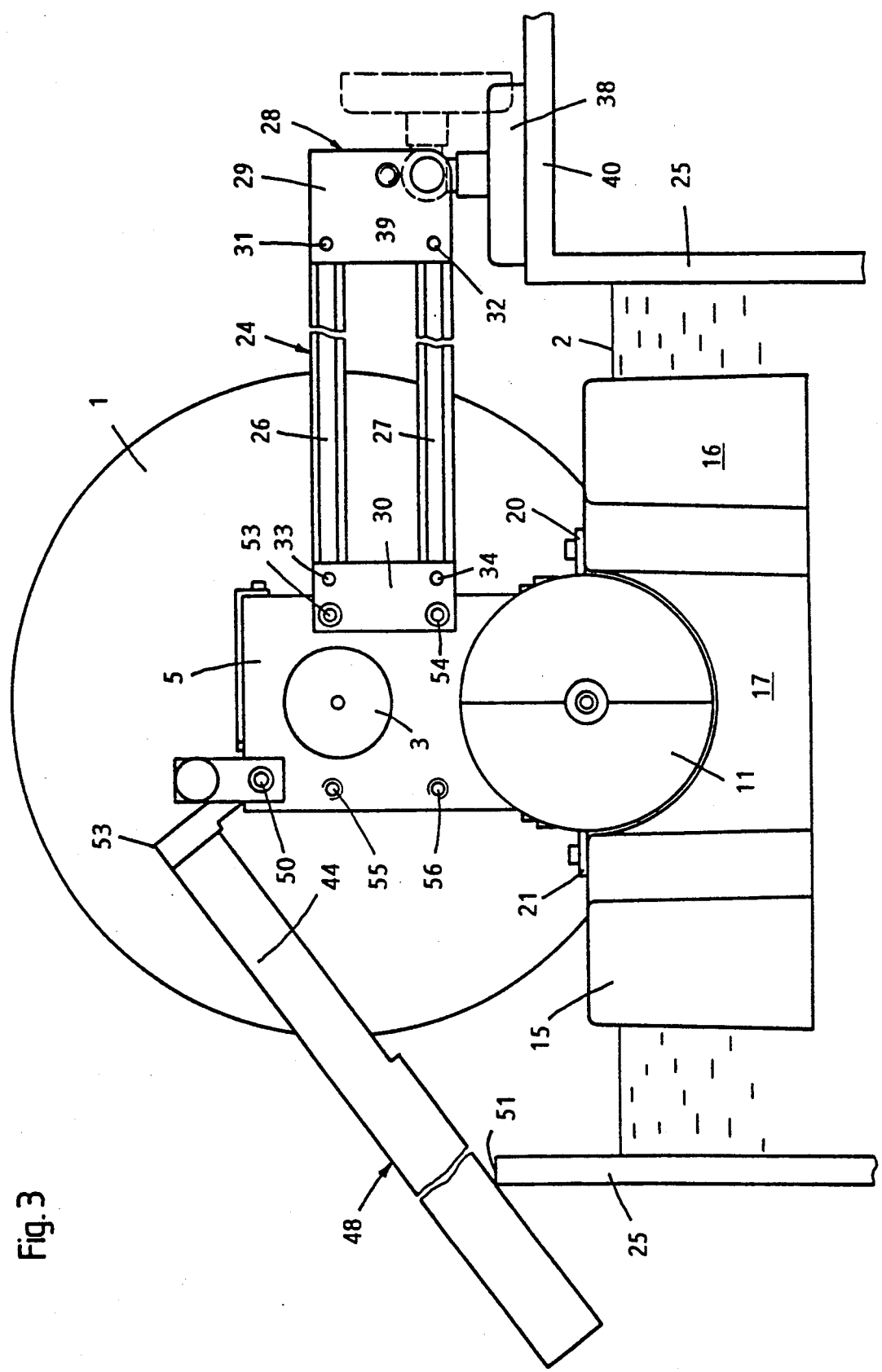
FIG. 3 a side view of the apparatus in the axial direction.

In accordance with the embodiment of the apparatus shown in FIG. 3 the fastening 24 for the connection of the apparatus to the liquid container is fixed by means of the screws 53,54 on the apparatus side facing the draining unit 48. For the arbitrary arrangement of the fastening on the same side as the draining unit 48, additional screw holes 55,56 for the screws 53,54 are provided on the housing support 5. Finally, the fastening 24 can also be fixed displaced by 90° to the web part 18 of the float 13 and screw holes 57,58 are provided for this purpose.

What is claimed is:

1. Apparatus for removing substances from a surface of a liquid, the liquid being contained in a container having a wall, the apparatus comprising:
   a receiving disc having a disc surface;
   float means to permit the apparatus to float on the liquid with partial immersion of said disc in the liquid;
   means for removing substances from the disc surface of the receiving disc;
   draining means for draining the substances removed by said removing means to the outside of the container;
   feed means positioned on the liquid surface for producing a surface flow normal to the disc surface, the feed means comprising a screw-like feed member; and
   a common drive member for driving both the receiving disc and the feed means, including a transmission gear to permit higher rotational sped of the feed means.

2. Apparatus as claimed in claim 1 wherein the float means comprises sidewalls, and a cross member about the feed means to facilitate surface flow of the liquid by the feed means.

3. Apparatus as claimed in claim 1 wherein the means for removing substances comprises at least one stripper engaging on one side of the receiving disk for draining off removed substances, a channel upon which the stripper is located, the channel and stripper being pivotally fixed to the apparatus by a spindle, wherein an upper end of the stripper engages on the receiving disk over in an area which corresponds to the immersion depth of the disk in the liquid.

4. Apparatus as claimed in claim 1 further comprising a fastening member having at least one uniaxially pivotable supporting member for connection of the apparatus at the height of the liquid level.

5. Apparatus as claimed in claim 4 wherein the fastening member is connected to the container.

6. Apparatus as claimed in claim 4 wherein the fastening member is connected to a device holding the container.

7. Apparatus as claimed in claim 4 wherein the supporting member has two parallel supporting arms, the ends of which are pivotally mounted about a spindle, the supporting arm being connected at one end to the apparatus, and at the other end to the fastening member.

8. Apparatus as claimed in claim 7 wherein the supporting arms are articulated to a support, the support being connected by means of an adjustable pivot pin to the fastening member.

9. Apparatus as claimed in claim 8 wherein the fastening member comprises a holding magnet.

* * * * *